United States Patent
Raghunandan (10) Patent No.: US 6,816,885 B1
(45) Date of Patent: Nov. 9, 2004

(54) METHOD AND SYSTEM TO HANDLE LARGE VOLUME OF E-MAIL RECEIVED FROM A PLURALITY OF SENDERS INTELLIGENTLY

(75) Inventor: Hulikunta Prahlad Raghunandan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 09/666,230

(22) Filed: Sep. 21, 2000

(51) Int. Cl.⁷ ............................................. G06F 15/16
(52) U.S. Cl. ........................................ 709/206; 709/207
(58) Field of Search ................................ 709/205, 206, 709/207; 725/47

(56) References Cited

U.S. PATENT DOCUMENTS

| | | | | |
|---|---|---|---|---|
| 4,745,559 A | * | 5/1988 | Willis et al. .................. 705/37 |
| 5,930,471 A | * | 7/1999 | Milewski et al. ........... 709/204 |
| 5,948,058 A | | 9/1999 | Kudoh et al. |
| 6,278,996 B1 | * | 8/2001 | Richardson et al. ........... 707/6 |
| 6,343,311 B1 | * | 1/2002 | Nishida et al. .............. 709/203 |
| 6,356,633 B1 | * | 3/2002 | Armstrong ............. 379/265.11 |
| 6,424,997 B1 | * | 7/2002 | Buskirk et al. ............. 709/206 |
| 6,442,592 B1 | * | 8/2002 | Alumbaugh et al. ........ 709/206 |
| 6,463,462 B1 | * | 10/2002 | Smith et al. ................ 709/206 |
| 6,507,866 B1 | * | 1/2003 | Barchi ........................ 709/207 |
| 6,522,727 B1 | * | 2/2003 | Jones ....................... 379/88.23 |
| 6,529,942 B1 | * | 3/2003 | Gilbert ........................ 709/206 |
| 6,542,923 B2 | * | 4/2003 | Nguyen ....................... 709/206 |
| 6,609,138 B1 | * | 8/2003 | Merriam ..................... 707/204 |
| 6,654,779 B1 | * | 11/2003 | Tsuei ........................... 718/101 |
| 2001/0029455 A1 | * | 10/2001 | Chin et al. ................... 704/277 |
| 2001/0056366 A1 | * | 12/2001 | Naismith ..................... 705/10 |
| 2002/0013744 A1 | * | 1/2002 | Tsunenari et al. ............. 705/28 |
| 2002/0091777 A1 | * | 7/2002 | Schwartz .................... 709/206 |
| 2002/0129275 A1 | * | 9/2002 | Decuir ........................ 713/201 |
| 2002/0198950 A1 | * | 12/2002 | Leeds ......................... 709/206 |
| 2003/0023721 A1 | * | 1/2003 | Vinberg ..................... 709/224 |

FOREIGN PATENT DOCUMENTS

| | | | | |
|---|---|---|---|---|
| EP | 0371605 A2 | * | 6/1990 | ........... H04L/12/54 |
| JP | 02170642 A2 | | 2/1990 | |
| JP | 04351134 A2 | | 4/1992 | |
| JP | 06162085 A2 | | 10/1992 | |
| JP | 2002073478 A | * | 3/2002 | ........... G06F/13/00 |
| JP | 2002091871 A | * | 3/2002 | ........... G06F/13/00 |

* cited by examiner

Primary Examiner—Bunjob Jaroenchonwanit
(74) Attorney, Agent, or Firm—Anthony V. S. England; T. Rao Coca; Manny Schecter (57) ABSTRACT

This invention relates to a method, system and computer program product for intelligently handling a large volume of emails received from a plurality of senders by automatically parsing the email header and body to capture specified keywords and preparing a reply template using an expert system to analyze the received emails that are stored in a personalized email database.

28 Claims, 4 Drawing Sheets

METHOD AND SYSTEM TO HANDLE LARGE VOLUME OF E-MAIL RECEIVED FROM A PLURALITY OF SENDERS INTELLIGENTLY

FIELD OF THE INVENTION

This invention relates to a method and system to handle large volume of e-mail received from a plurality of senders and generate suitable response intelligently.

BACKGROUND OF THE INVENTION

With an increase in e-mail usage there is a need to add powerful features to e-mail tools. E-mail usage is likely to increase at a phenomenal rate. This includes personal and official mail. With increasing mail volumes, users will feel the need to use more powerful e-mail tools. Some of the problems that are likely to be faced by users in the near future is:

1. Handling an enormous amount of mail.
2. Retain quality of mail response for all the mails. Typically it has been observed that
   a. Mail response to mails read at the end of a day is poor in quality of content.
   b. Mail response to mails after the first 50 odd mails decreases steadily in quality.
   c. Human fatigue and urgency during office work also take their toll and sometimes users tend to be arbitrary in handling mail not giving the right attention at the right place.

This leads to a lot of problems in professional and personal scenarios.

The impact of this could be so far reaching especially in very influential and top positions (technical or management) that in a professional environment it could also lead to huge financial losses.

So far no serious study has been done on the impact of arbitrary treatment of electronic mail on the productivity, effectiveness and balance sheets of companies and the solution that would alleviate some of its effects. With a splurge in dot.com companies, and a present 160 million global users, e-mail usage is likely to assume gargauntan proportions and it is likely that in the future companies would appoint e-mail screeners to screen and prioritize mail. It is estimated that 500 million users would be hooked to the net by 2003. Add to this the growing intranet and extranet usage which is also likely to increase with e-business. Presently the members of senior management in large organizations who handle high volume e-mail already have their secretaries to help them handle mail.

In fact 90% of time spent by a manager in any industry is in communicating (including meetings, telephone calls, mail), in the coming years there is going to be major shift towards mail usage especially in non-IT industries where the emphasis of communication is going to shift strategically to electronic mail.

With burgeoning e-mail quantity, there is a need to have special focus on the content of e-mail. E-mail usage is likely to become monotonous, ubiquitous and last but not the least extremely time consuming due to large volume. Consequently a great deal of conscious effort needs to be put into maintaining the quality of e-mail content especially in a business scenario. Arbitrary e-mail usage in an e-business scenario could lead to catastrophic effects. On the other hand high quality e-mail content with richness and relevance is likely to have a very positive impact on an e-business.

E-mail being a human activity so far, is therefore riddled by human problems like fatigue, lack of concentration and lack of time. There is a dire need for e-mail tools, which can alleviate the problems described above.

Let us consider the existing scenario in a well connected company.

While receiving large no: of e-mails:
1. The number of e-mails could be sufficiently large that key individuals may not have the time to browse through the same and generate replies for each of them.
2. While replying to a plurality of senders the user seldom remembers the a is significant contents of the mails sent by these senders over a period of time while composing the reply. Whatever little the user recollects is limited by his/her memory of the said detail. The absence of this takes away the richness and relevance of contents. Sometimes irrelevant content inclusion by oversight or poor memory leads to further needless mail exchange apart from bandwidth expense and other image/goodwill/business damages. Precious time is anyway lost in the process.

Presently mail handling is done by:
a. Reading every single mail and replying to mails separately. This can become really cumbersome, tiring and time consuming especially if the number of related mails received is in the tune of hundreds or thousands. The quality of replies also decreases as the number of mails increases in quantity. A modest estimate of the amount of time spent by an individual on mails is discussed below.
b. As far as richness of content is concerned there is no systematic method used to lookup the relevant information from previous mails. This leads to understatements, misrepresentations, approximations, misunderstandings and sometimes leads to needless mail exchanges. In a business scenario this also leads to potential business loss.

An E-mail Usage Survey:

An e-mail usage survey was conducted on 20 members of a junior technical group on a normal business day in IBM Global Services India (P) Ltd. Following was the finding.

Assumptions:
1. Lotus notes, Netscape mail, Unix mail and all other kinds of mail were included.
2. One-liners are one-line messages per mail.
3. Small messages would contain 2–10 lines per mail.
4. Medium length messages would contain 10–100 lines per mail.
5. Long length messages would contain 100–500 lines per mail, including attachments.

| | | Estimated Time spent in seconds | | | | | | | | |
|---|---|---|---|---|---|---|---|---|---|---|
| Type of mail | Choose & point to msg, read subject & sender, prioritize | Open the msg in | Read the msg | Under-stand the msg | Re-read msg | Frame reply | Review reply | Time spent with reply | Time Spent with out reply | Time spent on new msg |
| One liner | 1 | 1 | 1 | 1 | 0 | 2 | 0 | 6/60 mins | 4/60 mins | 2/60 mins |

-continued

| | | | | | | | | | | |
|---|---|---|---|---|---|---|---|---|---|---|
| Short message | 1 | 1 | 10 | 5 | 5 | 10 | 5 | 37/60 mins | 22/60 mins | 15/60 mins |
| Medium message | 1 | 1 | 120 | 60 | 20 | 120 | 60 | 6 mins 22 secs | 3 mins 22 secs | 3 mins |
| Long message | 1 | 1 | 480 | 300 | 60 | 480 | 300 | 27 mins 2 secs | 14 mins 2 secs | 13 mins |

| | Avg. no: of mails received in a day (include official and personal) | Avg. no: of new messages sent in a day | Avg. no: of replies to messages sent in a day. | Avg no: of one liners received per day | Avg no: of short messages received per day | Avg no: of medium length messages received per day | Avg no: of long messages received per day (including Attachments) |
|---|---|---|---|---|---|---|---|
| Mails | 14 | 5 | 5 | 2 | 6 | 4 | 1 |

As can be seen from the above only 5 of 14 mails were needed to be replied to, which is 36% of all mails received.

Approximately 36% of total mails received were sent anew.

Approximately 64% of all mails received were read but not replied to. Assuming the % distribution shown above we get:

| Mail type | Time taken |
|---|---|
| One liners | 0.36 * 6/60 + 0.36 * 4/60 + 0.64 * 2/60 = 4.88/60 minutes |
| Short messages | 0.36 * 37/60 + 0.36 * 22/60 + 0.64 * 15/60 = 30.84/60 minutes |
| Medium messages | 0.36 * (6 + 22/60) + 0.36 * (3 + 22/60) + 0.64 * 3 = 5.42 minutes |
| Long messages | 0.36 * (27 + 2/60) + 0.36 * (14 + 2/60) + 0.64 * 13 = 23 minutes |
| Total | 28 minutes 35 seconds → 28 minutes (approx.) |

This a very modest estimate.

Managers spend 90% of their time communicating (e-mail, telephone and meetings) and therefore the time spent by them on e-mail is much more than what is seen above. Senior management spends much more time in handling mail.

Extrapolating the above figure of 28 minutes for every 14 mails we get the following data.

| No: of mails received in a business day | Total time spent (including reading and replying to selected mails) |
|---|---|
| 10 | 20 minutes |
| 50 | 1 hour 40 minutes |
| 100 | 3 hours 20 minutes |
| 500 | 16 hours 40 minutes |
| 1000 | 33 hours 20 minutes |

Some recent attempts at solving these problems are described in U.S. Pat. No. 5,948,058 and Japanese patent laid-open publication (Kokai) nos. Heisei 6-162085, Heisei 2-170642 and Heisei 4-351134. However, all these patents are limited in the scope of their solutions, as none of these utilize the power of available technology in the form of expert systems. Furthermore, none of these patents addresses the issue of generating replies to the received emails automatically.

The object of this invention is to provide a method and a system for handling large amount of mail efficiently, effectively and intelligently including automatic generation of responses using an expert system.

To achieve the said objective this invention provides in a computing system a method to handle large volume of e-mail received from a plurality of senders intelligently, by automatically processing each email based on a pre-determined classification system and stored information, said method comprising the steps of:

receiving and sending the electronic mails, parsing the electronic mail header to capture keywords for the purpose of identifying the sender, the subject and specific key words and/or phrases, parsing the electronic mail body including attachments if any, for keywords and/or phrases for purpose of categorizing the e-mail for response, storing the said received emails in a personalized email database (PED), analyzing the emails stored in the PED for identifying co-relations among received e-mails using an expert system (ES) with machine learning capabilities to assist the user in analyzing and preparing replies, preparing a reply template using a reply template generator (RTG), storing the email replies in said PED, configuring said PED and said ES using an personalized email database configurator (PEC) for updation.

The above method further includes:

storing of the received and sent e-mails in a mailbox (MB) within said PED, storing the result of the analysis by said expert system in New Knowledge Base (NKB) in the said PED.

The above method further includes storage of personal data profile of the user, calendar of appointments/meetings, current job contents in said PED.

The above method further includes the accessing of said PED over a network so as to make it useful to a travelling user.

The above method further includes the accessing of said PED through appropriate facilities including palm pilots.

The above method further includes:
optionally generating the reply template,
selecting mail type on which to generate reply template e.g. one-liner, short, medium long replies,
enabling/disabling history search and intelligent reply template generation for specific type of mails for short mails,
enabling/disabling history search and intelligent reply template generation for specific type of mails for cc'ed type or bcc'ed type or mails sent to newsgroups,
specifying history search and intelligent reply template generation parameters like:
whether to search on subject and/or sender,
time period in which the messages need to be searched for,
type of message contents to be included/excluded,
scheduling deletion of mails from the MB and NKB,
scheduling sending of mails,
specifying latest first or oldest first while generating relevant intelligent reply,
specifying limits on inclusion of older reply contents—time period wise, volume wise and bandwidth wise,
specifying criteria for inclusion/exclusion of keywords,
providing access to multiple PEDs at various locations over the network,
providing on-the-fly exclusion/inclusion of original mail and reply contents including the various levels of replies and counter-replies by the user through said PEC.

The above method further includes displaying said reply template on the screen by said RTG based on searches conducted within the NKB in said PED.

The above method further includes displaying of:
the mail received R1,
reply sent to R1–S1,
reply received on S1–R2,
reply sent to R2–S2,
reply received on S2–R3 . . .
by said RTG, serially and in chronological sequence, individually or in groups of R1, R2, R3 or S1, S2, S3 or in any combination requested by the user, either in configurable colors and/or with changed font type and size.

The above method further includes viewing and searching of the database by said RTG for relevant emails/messages with:
the same subject,
the same sender and same subject
the same subject and any one of the recipients listed in the cc: list or the To: list and various other similar combinations.

The said reply template is in the same format in which said attachments have been received.

The above method further includes generation of co-relations and new associations by said ES using state of art and state of the practice techniques of NLP, AI, machine learning.

The above method further includes searching said PED by said ES for co-relations amongst e-mails received
sender wise,
senders within a particular timeframe,
thread wise or subject wise,
sender and subject wise,
sender, subject and date wise,
sender, keyword wise.

In a computing system, a system to handle large volume of e-mail received from a plurality of senders intelligently, by automatically processing each email based on a pre-determined classification system and stored information, comprising:
means for receiving and sending the electronic mails,
means for parsing the electronic mail header to capture keywords for the purpose of identifying the sender, the subject and specific key words and/or phrases,
means for parsing the electronic mail body including attachments if any, for keywords and/or phrases for purpose of categorizing the e-mail for response,
means for storing the said received emails in a personalized email database (PED),
means for analyzing the emails stored in the PED for identifying co-relations among received e-mails using an expert system (ES) with machine learning capabilities to assist the user in analyzing and preparing replies,
means for preparing a reply template using a reply template generator (RTG),
means for storing the email replies in said PED,
means for configuring said PED and said ES using an personalized email database configurator (PEC) for updation.

The above system further includes:
means for storing the received and sent e-mails in a mailbox (MB) within said PED,
means for storing the result of the analysis by said expert system in New Knowledge Base (NKB) in the said PED.

The above system further includes means for storing personal data profile of the user, calendar of appointments/meetings, current job contents in said PED.

The above system further includes the means for accessing said PED over a network so as to make it useful to a travelling user.

The above system further includes the means for accessing said PED through appropriate facilities including palm pilots.

The above system further includes means for allowing the user through said PEC to:
optionally generate the reply template,
select mail type on which to generate reply template e.g. one-liner, short, medium long replies,
enable/disable history search and intelligent reply template generation for specific type of mails for short mails,
enable/disable history search and intelligent reply template generation for specific type of mails for cc'ed type or bcc'ed type or mails sent to newsgroups,
specify history search and intelligent reply template generation parameters like,
whether to search on subject and/or sender,
time period in which the messages need to be searched for,
type of message contents to be iniclucded/excluded
schedule deletion of mails from the MB and NKB,
schedule sending of mails,
specify latest first or oldest first while generating relevant intelligent reply,
specify limits on inclusion of older reply contents—time period wise, volume wise and bandwidth wise, specify criteria for inclusion/exclusion of keywords, provide access to multiple PEDs at various locations over the network, provide on-the-fly exclusion/inclusion of original mail and reply contents including the various levels of replies and counter-replies.

The above system further includes means for displaying said reply template on the screen by said RTG based on searches conducted within the NKB in said PED The above system further includes means for displaying:

the mail received R1, reply sent to R1–S1, reply received on S1–R2, reply sent to R2–S2, reply received on S2–R3 . . .

by said RTG, serially and in chronological sequence, individually or in groups of R1, R2, R3 or S1, S2, S3 or in any combination requested by the user, either in configurable colors and/or with changed font type and size.

The above system further includes means for viewing and searching of the database by said RTG for relevant emails/messages with:

the same subject, the same sender and same subject, the same subject and any one of the recipients listed in the cc: list or the To: list and various other similar combinations.

The above system further includes means for generating co-relations and new associations by said ES using state of art and state of the practice techniques of NLP, AI, machine learning.

The above system further includes means for searching said PED by said ES for co-relations amongst e-mails received sender wise, senders within a particular timeframe, thread wise or subject wise, sender and subject wise, sender, subject and date wise, sender, keyword wise.

A computer program product comprising computer readable program code stored on computer readable storage medium embodied therein for causing a computer to handle large volume of e-mail received from a plurality of senders intelligently, said computer program code comprising:

computer readable program code means configured for receiving and sending the electronic mails, computer readable program code means configured for parsing the electronic mail header to capture keywords for the purpose of identifying the sender, the subject and specific key words and/or phrases computer readable program code means configured for parsing the electronic mail body including attachments if any, for keywords and/or phrases for purpose of categorizing the e-mail for response, computer readable program code means configured for storing the said received emails in a personalized email database (PED), computer readable program code means configured for analyzing the emails stored in the PED for identifying co-relations among received e-mails using an expert system (ES) with machine learning capabilities to assist the user in analyzing and preparing replies, computer readable program code means configured for preparing a reply template using a reply template generator (RTG), computer readable program code means configured for storing the email replies in said PED.

computer readable program code means for configuring said PED and said ES using an personalized email database configurator (PEC) for updation.

The above computer program product further includes:

computer readable program code means configured for storing of the received and sent e-mails in a mailbox (MB) within said PED, computer readable program code means configured for storing the result of the analysis by said expert system in New Knowledge Base (NKB) in the said PED.

The above computer program product further includes computer readable program code means configured for storage of personal data profile of the user, calendar of appointments/meetings, current job contents in said PED.

The above computer program product further includes computer readable program code means configured for accessing said PED over a network so as to make it useful to a travelling user.

The above computer program product further includes computer readable program code means configured for accessing said PED through appropriate facilities including palm pilots.

The above computer program product further includes computer readable program code means configured for allowing the user through said PEC to:

optionally generate the reply template, select mail type on which to generate reply template e.g. one-liner, short, medium long replies, enable/disable history search and intelligent reply template generation for specific type of mails for short mails, enable/disable history search and intelligent reply template generation for specific type of mails for cc'ed type or bcc'ed type or mails sent to newsgroups, specify history search and intelligent reply template generation parameters like, whether to search on subject and/or sender, time period in which the messages need to be searched for, type of message contents to be included/excluded, schedule deletion of mails from the MB and NKB, schedule sending of mails, specify latest first or oldest first while generating relevant intelligent reply, specify limits on inclusion of older reply contents—time period wise, volume wise and bandwidth wise, specify criteria for inclusion/exclusion of keywords, provide access to multiple PEDs at various locations over the network, provide on-the-fly exclusion/inclusion of original mail and reply contents including the various levels of replies and counter-replies.

The above computer program product further includes computer readable program code means configured for displaying said reply template on the screen by said RTG based on searches conducted within the NKB in said PED.

The above computer program product further includes computer rebadable program code configured means for displaying of:

the mail received R1 reply sent to R1–S1 reply received on S1–R2 reply sent to R2–S2 reply received on S2–R3 . . .

by said RTG, serially and in chronological sequence, individually or in groups of R1, R2, R3 or S1, S2, S3 or in any combination requested by the user, either in configurable colors and/or with changed font type and size.

The above computer program product further includes computer readable program code means configured for viewing and searching of the database by said RTG for relevant emails/messages with:

the same subject, the same sender and same subject the same subject and any one of the recipients listed in the cc: list or the To: list and various other similar combinations.

The above computer program product further includes computer readable program code means configured for generating of co-relations and new associations by said ES using state of art and state of the practice techniques of NLP, AI, machine learning.

The above computer program product further includes computer readable program code means configured for searching the said PED by said ES for co-relations amongst e-mails received sender wise, senders within a particular timeframe, thread wise or subject wise, sender and subject wise, sender, subject and date wise, sender, keyword wise.

The invention will now be described with reference to the accompanying drawings.

Figure 1:
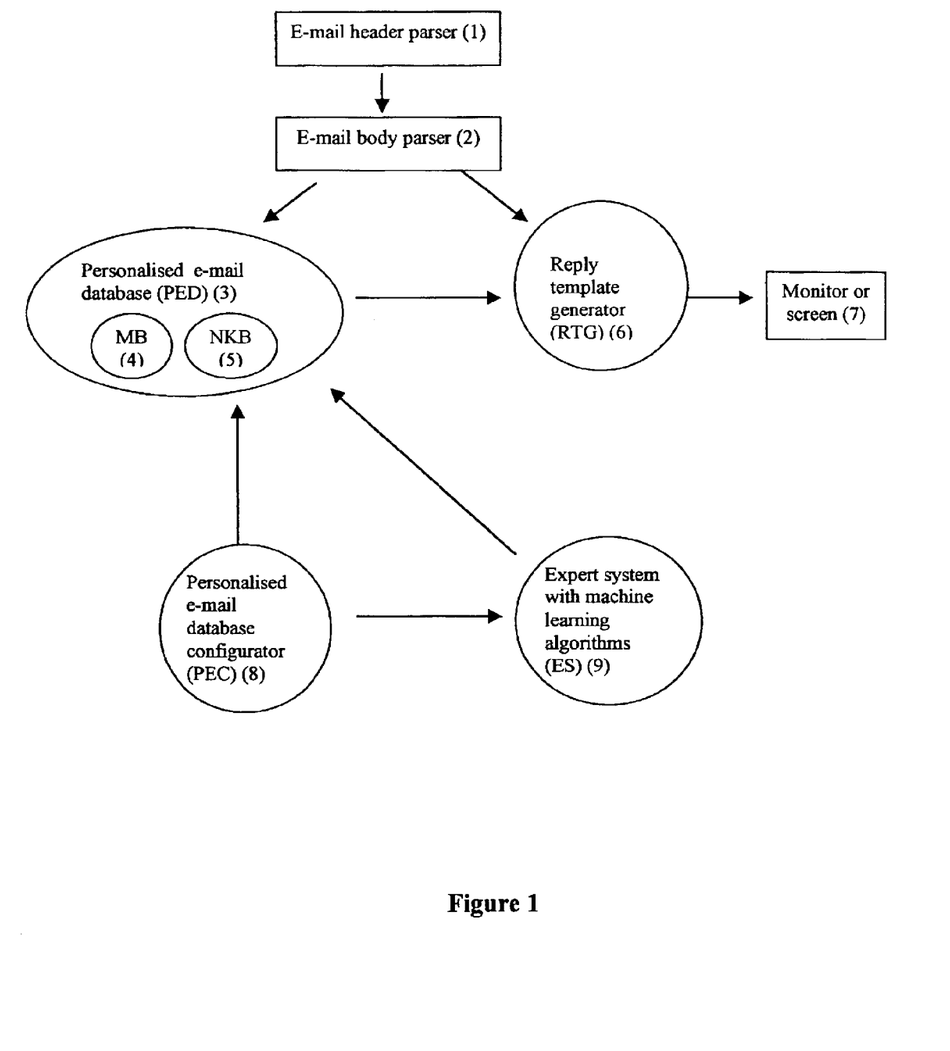
FIG. 1 shows the entity diagram of the system, according to this invention.

As shown in FIG. 1, email header parser (1) parses the received email header to extract information as defined by the user. The email message is then parsed by email body parser (2) to extract user defined keywords and/or phrases. The received email is then stored in mailbox (MB) (4) located in personalized email database (PED) (3). The PED contains 2 logical parts, the mailbox (MM) and the New Knowledge Base (NKB). The MB contains mail archives whereas the NKB contains assertions derived from the mail archives. The MB contains all sent and received mail while the NKB contains information generated by the expert system (ES) (9). Reply template generator (RTG) (6) retrieves the received email from the mailbox (MB) (4) and generates the output reply template in accordance with user defined rules on the monitor (7) of the system. Personalized email database configurator (PEC) (8) enables the user to configure the personalized email database system (PED) (3), RTG (6) as well as the expert system (ES) (9), which operates on the personalized email database system WED) (3) using machine learning algorithms in order to identify co-relations between different email messages and generate new knowledge base (NKB) (5), which is used by the reply template generator (RTG) (6) in formulating the output reply. The invention also provides a facility wherein the PED is accessible over a network, so that it can be accessed by a travelling user. Appropriate facilities are also provided to support wireless access to the PED using pervasive computing equipment like palm pilots etc. Personalized e-mail archive or database (PED) (Supports Netscape Inbox format, notes nsf format, Claris format, Eudora format, Microsoft Outlook Express format, IE file format, Unix mbox format, Qualcomm file format, etc. with the help of converters).

Figure 2:
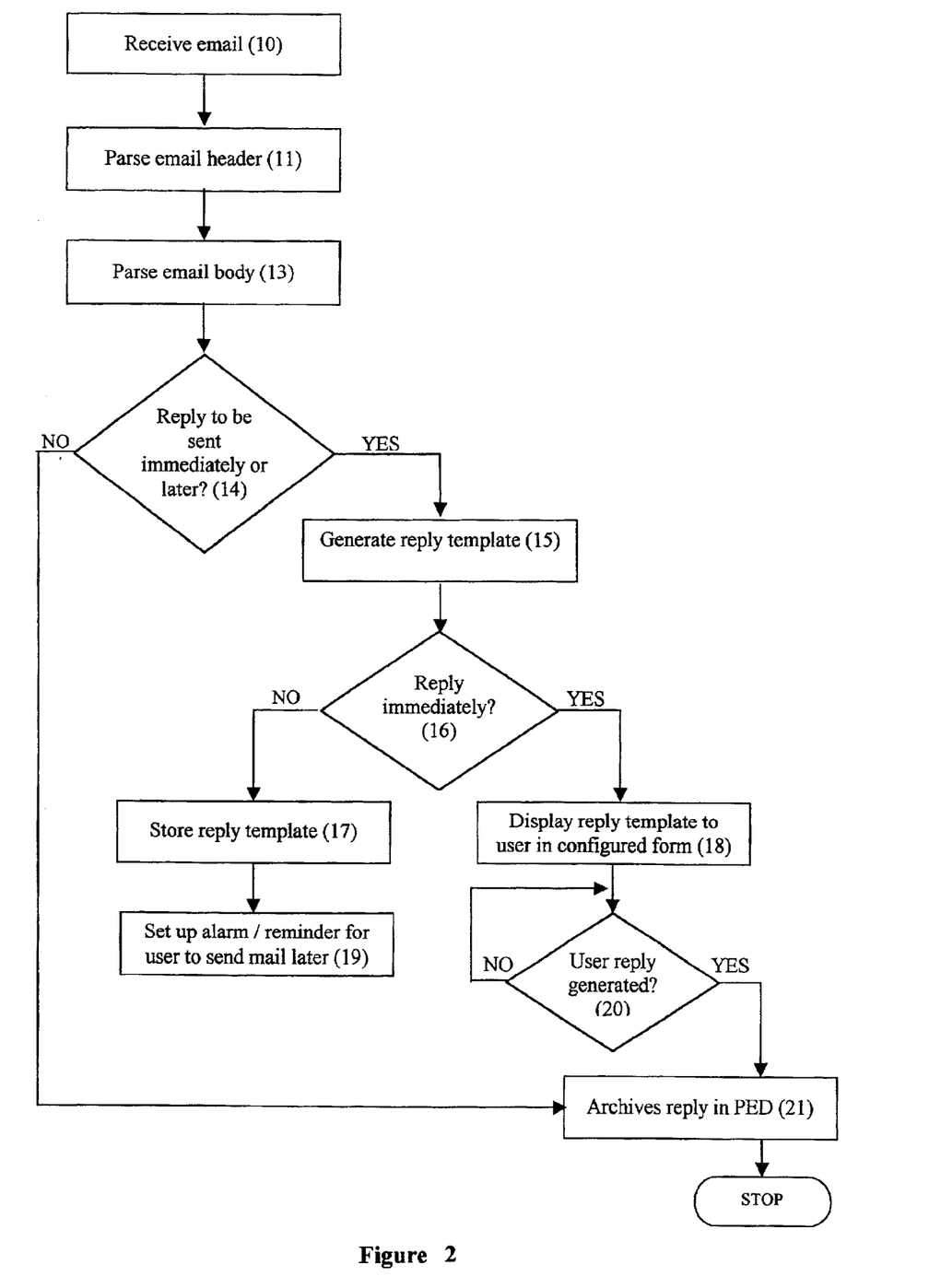
FIG. 2 shows the flow diagram describing the operation of the system, according to this invention.

Referring to FIG. 2, the email receiving means receives the email (11). The email header is then parsed (12) by a text parser (1) to extract information about sender, subject, domain, address for reply including CC, Bcc, Newsgroup information, as defined by configuration data. The email is then further parsed for the body contents (13) by text parser (2) to identify whether the email needs to be replied to immediately, later or no reply is required. Further, the parser searches for user defined keywords and/or phrases/clauses. If no reply is to be generated the email along with the parsed information is archived (21) in the PED (3). If a reply is required, the reply template generator (RTG) is invoked to generate a reply template (15), which includes:

generation of appropriate salutation and end-of-message signature details, as configured inclusion of original email contents as configured, searching of mailbox (MB) and new knowledge base (NKB) in personalized email database (PED) based on configured parameters including message type (one-liner, short, medium, long)

subject, sender, recepient, keyword, thread; or combination thereof, to extract information for inclusion in the reply If the reply is required immediately, the generated template is displayed to the user on the monitor of the system in the configured format (18). The user completes the reply (20) and the system archives the reply in the PED (21) for subsequent transmission. If however, the email is to be replied—to later, the generated reply template is stored (17) in the PED and the PED is set up to generate an alarm or reminder for the user at the appropriate time (19).

Figure 3:
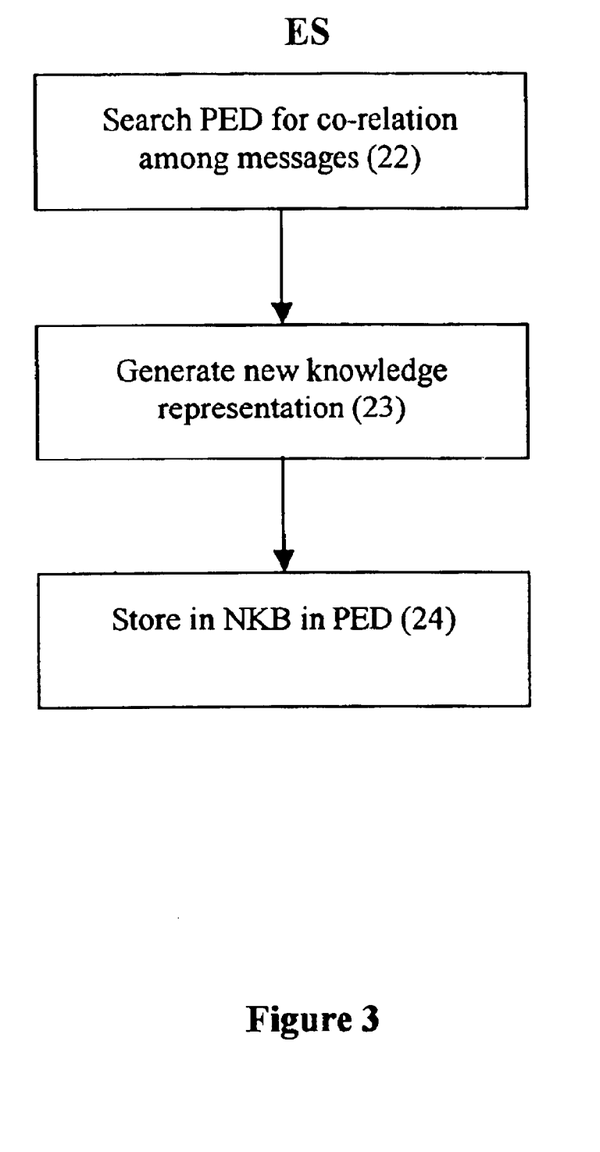
FIG. 3 shows the flow diagram describing the operation of the expert system.

FIG. 3 describes the functioning of the expert system, which operates on the PED to generate new knowledge base (NKB). The expert system searches (22) the PED for co-relations among messages based on configured parameters. It then generates new knowledge representations using machine learning techniques.

Machine Learning—Using the ES and the PED.

A few cases are explained to illustrate the nature and scope of machine learning in an e-mail scenario.

Case-1: First Level Knowledge Generation

Consider the case when an e-mail is received from a user $u_1$, subject $s_1$, possessing a significant keyword $k_1$. Then an assertion $a_1$ can be extracted from this e-mail by the expert system and placed in the NKB.

An assertion is a trite and terse conversion of the sentence containing the keyword.

In reality assertions could represent opinions of users, or situations involving users, or statements of fact.

The ES would use NLP techniques (symbolic logic, predicate calculus etc.) to convert the English string into an assertion that is updated into the NKB. The RTG accesses the NKB while generating a reply template.

Let's say that:
User: $u_1$
Subject: $s_1$
Keyword: $k_1$

For each set of ($u_1$, $s_1$, $k_1$) at least one assertion $a_1$ can be generated.

The ES can be configured to generate more than one assertion per set of ($u_1$, $s_1$, $k_1$).

Now, if this assertion $a_1$ happens to involve either $u_1$ or $s_1$ or a combination of $u_1$ and $s_1$, this knowledge could be used whenever there is a query on a keyword involving ($u_1$,$s_2$) or ($u_2$,$s_1$).

Now $a_1$ could be suggested as the new assertion while framing a reply template to any of the users $u_1$ or $u_2$.

This can be used to refer to the NKB for the most useful and relevant assertion, which can be solicited by the user by using a hot key from the RTG.

The machine learning engine of the ES updates the NKB with the knowledge representations like ($u_1$, $s_1$, $k_1$, $a_1$), ($u_2$, $s_1$, $k_1$, $a_2$) etc.

Thus as the number of e-mails increases, the NKB is updated with new information by the machine learning engine which comes with new associations of user, subject, keyword and assertion combinations.

Case-2: Second Level Knowledge Generation

Since the NKB has records with associations of the type (u, s, k, a)

We could have various assertions generated on a particular set and also there could be unique assertions that can be further derived from these assertions.

Assuming that a, to an are the assertions derived from various sets of user, subject, keyword etc.

Let A be the set of all assertions generated using the first level knowledge generation technique shown above on the U, S, K. Where U-Set of all users
S-Set of all subjects
K-Set of associate keywords.

Then:
A-$a_1$, $a_2$, $a_3$, . . . , $a_n$ would be the set of all assertions generated at the first level.

Newer assertions can be generated using the above associations like $a_{12}$ can be generated using $a_1$ and $a_2$ if appropriate. $a_{123}$ can be generate using $a_1$, $a_2$ and $a_3$ Similarily, $a_{123 \ldots k}$ can be generated using assertions $a_1$ to $a_k$.

Case-3. Generating Higher Levels of Knowledge

The assertions generated from the $2^{nd}$ level knowledge generation can be further used to generate assertions at a higher level of knowledge using the same technique described above.

Other Issues:

The above mentioned cases are examples of implementation at the conceptual level. The cases mentioned above implement "learning" by updating the NKB with new knowledge representations in the form of assertions that can be derived from (U, S, K) combinations and their sub-components.

Then arises the question as to what should be the extent to which these knowledge representations can be updated to the NKB.

The extent to which knowledge representations can be derived will have to be made with care and caution else it would reach a situation where the ES repeats knowledge generation adinfinitum.

A situation could also be reached wherein the ES starts generating totally irrelevant knowledge.

Standard rules of thumb can be used initially by fixing an upper limit on assertion generation at each level of knowledge.

Gradually this can be improved/changed by observing the trend and historical evidence. The ES can also be used to convert all of the MB entries into NKB. This would ensure storing only the right and relevant information and later would pave the way for e-mail content standardization. The auxiliary benefits of such an approach would be reduced disk space for e-mail mail boxes.

Provisions can also be made to change the strategy periodically/continually depending on identifiable parameters, which are part of the ES and NKB.

Review of Advanced Mail Features of Existing E-mail Tools in Comparison with the Expert System used in this Invention Here is a brief review of leading e-mail clients.

Claris Emailer 2.0 Version 3—Provides filtering facilities, hierarchical mailboxes, provides a window that lists the results of searches. Does not allow users to send styled text with HTML mail.

QuickMail Pro 1.5.2—Provides good filtering and mailbox management features. But does not provide sufficient HTML support.

Microsoft Outlook Express 4.0—Good filtering facilities, hierarchical mailboxes. HTML support and conforms to the Open Internet standard.

Netscape Messenger 4.041—Conforms to Open Internet Standard apart from providing most of the above mentioned facilities.

Eudora Light 3.13—Offers hierarchical mailboxes and filters. Also provides for adding dockable windows, the ability to create filters quickly based on the current message and multiple nick names.

As can be seen from the above none of them offer the kind of facilities and features discussed in this invention.

Figure 4:
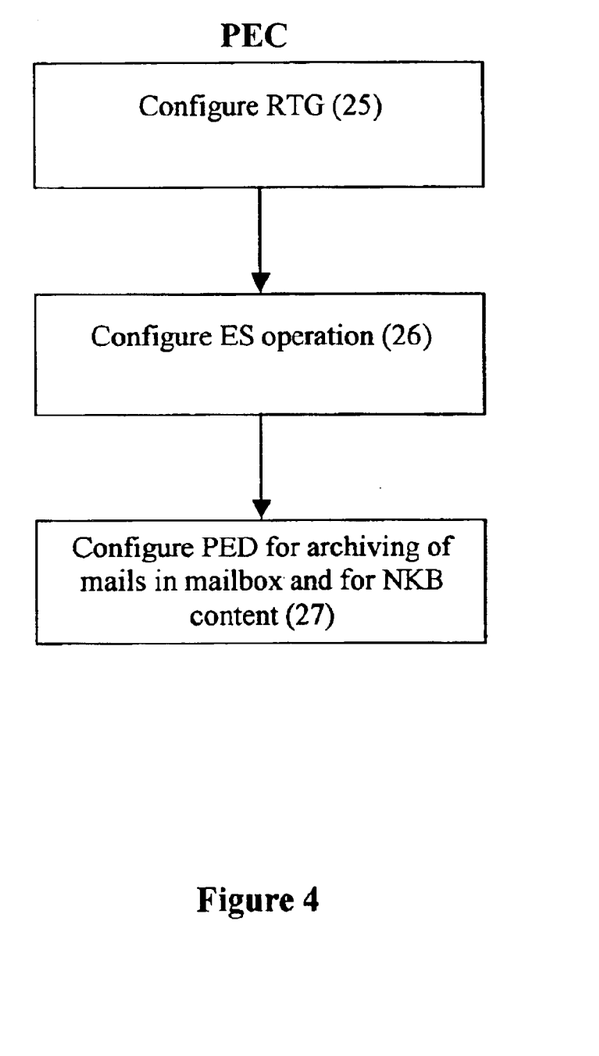
FIG. 4 shows the flow diagram of the personalized email database configurator (PEC).

FIG. 4 defines the operation of the personalized email database configurator (PEC). The PEC is used by the user to configure the RTG (25) for any one or more of the following options:

1. Automatic/manual reply template generation
2. Choose mail type on which to generate reply template:e.g oneliner, short, medium, etc.
3. Generate reply template including the original mail received. This shall include appropriate salutation and end of message signature details. The Reply Template Generator (RTG) interfaces with the PED, the ES and the monitor. The salutation and signature details are configurable.
4. Search sender-wise, thread-wise, keyword wise automatically either while generating reply template or while composing a new mail. There are function keys(Bot keys) in the reply template generator that can be configured to realise this.
5. Search PED object wise. Namely the invention is equipped to identify various file formats and is equipped to display a miniaturised versions of the object in a frame for easy association, identification and possible inclusion in a reply message or new mail message.
6. Provide frames on the screen where more information on searches made and hits found can be obtained.
7. Provide additional frames to search and view contents from the NKB.
8. Include information seen/searched from the frames into the reply by the RTG.
9. View a short form of the message, without the embedded replies optionally. This is only to facilitate easier viewing of one's own message, whether it is new or a reply to a received mail. The invention also provides a facility to view by prompting Mail received R1

Reply, sent to R1–S1.

Reply received on S1–R2

Reply sent to R2–S2

Reply received on S2–R3 etc. The above can be viewed serially in chronological sequence or viewed individually or viewed in groups of R1, R2, R3 or S1, S2, S3 etc. or in any combination as requested by the user. They can be reviewed either in different configurable colours and/or with changed font type and size.

10. View messages sender wise on the basis of keywords, date, sender/e-mail domain and subject by searching and extracting information from the PED.
11. View consolidated short form messages sender wise on the basis of keywords, date, sender/e-mail domain, objects, attachments and subject.
12. View consolidated long form messages sender wise on the basis of keywords, date, sender/e-mail domain and subject.
13. View consolidated full length form messages sender wise on the basis of keywords, date, sender/e-mail domain and subject.
14. Invoke feature where-in for messages of any or more amongst the various e-mail types one-line, short, medium, long and attachments, the tool searches the database for relevant messages with the same subject the same sender and same subject the same subject and any one of the recipients listed in the cc: list or the To: list.

and various other similar combinations.

The PEC is further used by the user for configuring the operation of the expert system (ES) in terms of defining keywords and associations and the levels of generation of assertions to operate on. The ES may also be configured for converting all or some of the mailbox (MB) entries into the new knowledge base (NKB). The ES can be configured to generate assertions user-wise with parameters some of which are listed here for the sake of illustration:

using ascending or descending chronology of mail for assertion generation.

a using user-wise, key-word-wise, subject-wise limits on assertion generation at each level of knowledge.

using assertion-wise limits on new assertion generation at higher levels of knowledge. Care should be taken to ensure that the ES does not stretch/exceed available software and hardware resources.

The PEC is also used to configure the personalized email database (PED) for archiving of mails in the mailbox (MB) and for the new knowledge base (NKB) content. The configuration can be defined for any of the following:

Store/File e-mails sent and received cumulatively in the PED that is configurable. Scheduled deletion of mails is provided for.

Automatically trim PED in order to remove no longer relevant mails, the invention accepts parameters that specify what kind of mails/attachments need to be deleted from the PED so as to occupy optimal disk space and increase the relevance and efficiency of searches made. This trimming can be done on both the MB and the NKB.

Enable/disable history search and intelligent reply template generation for specific kinds of mails. For e.g.: short mails.

Enable/disable history search and intelligent reply template generation for specific types of mails. For e.g. Cc'ed type or bcc'ed type or mails sent to newsgroups.

Specify history search and intelligent reply template generation parameters like:

Whether to search on subject and/or sender

Time period in which the messages need to be searched for.

Type of message contents to be included/excluded

Scheduled deletion of mails from the MB and NKB

Scheduled sending of mails.

Specify latest first or oldest first while generating relevant intelligent reply Specify limits on inclusion of older reply contents—time period wise, volume wise and bandwidth wise.

Specify search criteria inclusion/exclusion of keywords.

Provide for accessing multiple PED at various locations over the network.

Provide for on-the-fly exclusion/inclusion of original mail and reply contents including the various levels of replies and counter—replies.

Advantages of Expert System Based Intelligent Email System:

1. Time spent on mail reply and new mail composition is reduced significantly. The time reduced is almost to the tune of 50% using the E-mail results discussed earlier, because the user has to read the generated reply with the original mail at the same time.
2. The content of e-mail replies is made richer and relevant with details chosen from the PED containing past mails/ messages. These details can be excluded by the user if they are found irrelevant or unnecessary.
3. Selected types of mails can be sent automatically to certain individuals without the users' intervention, especially like calendar plans, acknowledgements and replies to meeting requests.
4. The invention uses parsing techniques and intelligently generates reply templates using historical data and assertions available in the PED. The volume and content of these reply templates and search mechanisms are fully configurable and can be chosen by the user to suit his/her e-mail profile and nature of e-mails. All of this leads to a general improvement in e-mail handling, storage, searching and reply generation.
5. The most significant feature of this invention is knowledge creation in the form of assertions in the NKB, which is part of the PED. This shall lead to a general improvement in e-mail content quality.
6. Conversion of MB contents into NKB assertions would pave the way to convert unstructured and haphazard information into structured knowledge that would be searchable and easily usable. The other auxiliary benefit would be that there would be massive savings on disk space occupied by e-mail mailboxes.

What is claimed is:

1. In a computing system, a method to intelligently handle e-mails comprising the steps of:

receiving the e-mails;

sending e-mail responses to ones of the received e-mails;

parsing headers of the e-mails to identify senders and subjects;

parsing bodies of the e-mails;

parsing keywords of the e-mails;

categorizing the e-mails in response to the parsing of the e-mail bodies, wherein the categorizing includes identifying when reply templates are to be prepared for responses to respective ones of the e-mails, the reply templates being for completion by a user preparing the responses to the e-mails;

storing the received e-mails and parsed senders, subjects and keywords in a personalized e-mail database (PED);

preparing the reply templates using a reply template generator (RTG), including the step of:

analyzing the e-mails senders, subjects, and keywords stored in the PED using an expert system (ES) with machine learning capabilities to extract certain content of the e-mails, wherein such extracted content is included in ones of the reply templates;

storing the email responses in said PED; and configuring said PED and said ES using an personalized email database configurator (PEC) for updation.

2. A method as claimed in claim 1, wherein the step of storing the received e-mails and parsed senders, subjects and keywords further comprises:

storing the received e-mails in a mailbox (MB) within said PED; and storing the parsed senders, subjects, and keywords, in a New Knowledge Base (NKB) in the PED.

3. A method as claimed in claim 1, wherein the step of analyzing the e-mails and senders, subjects and keywords stored in the PED further comprises the step of:

selecting certain types of the contents of the e-mails to be included in the reply templates.

4. A method as claimed in claim 3, wherein for the step of selecting certain types of the contents of the e-mails to be included in the reply templates, the selecting being responsive to ages of the e-mails.

5. A method as claimed in claim 1 further including the steps of:

categorizing the received and sent e-mails in categories including: i) initial e-mails received (e-mails R1), ii) e-mail responses sent for e-mails R1 (e-mails S1), iii) e-mails received in reply to e-mails S1 (emails R2), iv) e-mail responses sent for e-mails R2 (e-mails S2) and v) e-mails received in reply to e-mails S2 (e-mails R3); and displaying the e-mails to the user in combinations of the categories of the e-mails R1, R2, R3, S1, S2 and S3 requested by the user, wherein the e-mails are displayed so that the categories of the e-mails are distinguishable by distinctive appearances.

6. A method as claimed in claim 1 wherein said reply template for one of the received e-mails is in a same format as an attachments of the e-mail.

7. A method as claimed in claim 1 further including searching the PED by said ES for co-relations amongst the e-mails received, wherein the co-relations are determined responsive to at least one of the following: senders of the e-mails, subjects of the e-mails and keywords of the e-mails.

8. A method as claimed in claim 1, wherein the identifying when to prepare reply templates includes, for such a one of the reply templates, selecting among i) preparing the reply template immediately, ii) preparing the reply template at some future time, and iii) not preparing the reply template, the selecting being responsive to whether one of the received e-mails specifies a Cc address.

9. A method as claimed in claim 1, wherein the identifying when to prepare reply templates includes, for such a one of the reply templates, selecting among i) preparing the reply template immediately, ii) preparing the reply template at some future time, and iii) not preparing the reply template, the selecting being responsive to a length of one of the received e-mails.

10. A method as claimed in claim 1, wherein the categorizing of the e-mails includes identifying lengths of the e-mails, and the analyzing to extract certain content of the e-mails is responsive to the lengths.

11. In a computing system, a system to intelligently handle e-mails comprising:

means for receiving the e-mails;

means for sending e-mail responses to ones of the received e-mails;

means for parsing headers of the e-mails to identify senders and subjects;

means for parsing bodies of the e-mails;

means for parsing keywords of the e-mails;

means for categorizing the e-mails in response to the parsing of the e-mail bodies, wherein the means for categorizing includes means for identifying when reply templates are to be prepared for responses to respective ones of the e-mails, the reply templates being for completion by a user preparing the responses to the e-mails;

means for storing the received e-mails and parsed senders, subjects and keywords in a personalized e-mail database (PED);

means for preparing the reply templates using a reply template generator (RTG), including:

means for analyzing the e-mails senders, subjects and keywords stored in the PED using an Expert system (ES) with machine learning capabilities to extract certain content of the e-mails, wherein such extracted content is included in ones of the reply templates;

means for storing the email responses in said PED; and means for configuring said PED an said ES using an personalized email database configurator (PEC) for updation.

12. A system as claimed in claim 11, wherein the means for storing the received e-mails and parsed senders, subjects and keywords further comprises:

means for storing the received e-mails in a mailbox (MB) within said PED; and means for storing the parsed senders, subjects, and keywords in a New Knowledge Base (NKB) in the PED.

13. A system as claimed in claim 11, wherein the means for analyzing the e-mails and senders, subjects and keywords stored in the PED comprises:

means for selecting certain types of the contents of the e-mails to be included in the reply templates.

14. A system as claimed in claim 13, wherein for the means for selecting certain types of the contents of the e-mails to be included in the reply templates, the selecting being responsive to ages of the e-mails.

15. A system as claimed in claim 11, further comprising:

means for categorizing the received and sent e-mails in categories including: i) initial e-mails received (e-mails R1), ii) e-mail responses sent for e-mails R1 (e-mails S1), iii) e-mails received in reply to e-mails S1 (e-mails R2), iv) e-mail responses sent for e-mails R2 (e-mail S2) and iv) e-mails received in reply to e-mails S2 (e-mails R3); and means for displaying the e-mails to the user in combinations of the categories of the e-mails R1, R2, R3, S1, S2 and S3 requested by the user, wherein the e-mails are displayed so that the categories of the e-mails are distinguishable by distinctive appearances.

16. A system as claimed in claim 11 further including means for searching the PED by said ES for co-relations amongst e-mails received, wherein the co-relations are determined responsive to at least one of the following: senders of the e-mails, subjects of the e-mails and keywords of the e-mails.

17. A system as claimed in claim 11, wherein the means for identifying when to prepare reply templates includes, for such a one of the reply templates, means for selecting among i) preparing the reply template immediately, ii) preparing the reply template at some future time, and iii) not preparing the reply template, the selecting being responsive to whether one of the received e-mails specifies a Cc address.

18. A system as claimed in claim 11, wherein the means for identifying when to prepare reply templates includes, for such a one of the reply templates, means for selecting among i) preparing the reply template immediately, ii) preparing the reply template at some future time, and iii) not preparing the reply template, the selecting being responsive to a length of one of the received e-mails.

19. A system as claimed in claim 11, wherein the means for categorizing of the e-mails includes means for identifying lengths of the e-mails, and the means for analyzing to extract certain content of the e-mails is responsive to the lengths.

20. A computer program product comprising computer readable program code stored on computer readable storage medium embodied therein for causing a computer to intelligently handle e-mails, said computer product comprising:
  computer readable program code means configured for receiving e-mails;
  computer readable program code means configured for sending e-mail responses to ones of the received e-mails;
  computer readable program code means configured for parsing headers of the e-mails to identify senders, and subjects;
  computer readable program code means configured for parsing bodies of the e-mails;
  computer readable program code means configured for parsing keywords of the e-mails;
  computer readable program code means configured for categorizing the e-mails in response to the parsing of the e-mail bodies wherein the categorizing includes identifying when reply templates are to be prepared for responses to respective ones of the e-mails, the reply templates being for completion by a user preparing the responses to the e-mails;
  computer readable program code means configured for storing the received e-mails and parsed senders, subject and keywords in a personalized e-mail database (PED);
  computer readable program code means configured for preparing the reply templates using a reply template generator (RTG), including:
    computer readable program code means configured for analyzing the e-mails senders, subjects and keywords stored in the PED using an expert system (ES) with machine learning capabilities to extract certain content of the e-mails,
    wherein such extracted content is included in ones of the reply templates;
  computer readable program code means configured for storing the email responses in said PED; and
  computer readable program code means for configuring said PED and said ES using an personalized email database configurator (PEC) for updation.

21. A computer program product as claimed in claim 20, wherein computer readable program code means configured for storing the received e-mails and parsed senders, subjects and keywords further comprises:
  computer readable program code means configured for storing the received e-mails in a mailbox (MB) within said PED; and;
  computer readable program code means configured for storing the parsed senders, subjects and keywords in a New Knowledge Base (NKB) in the PED.

22. A computer program product as claimed in claim 20, wherein the computer readable program code means configured for analyzing the e-mails and senders, subjects and keywords stored in the PED further comprises:
  computer readable program code means configured for selecting certain types of the contents of the e-mail to be included in the reply templates.

23. A computer program product as claimed in claim 22, wherein for the computer readable program code means configured for selecting certain types of the contents of the e-mails to be included in the reply templates, the selecting being responsive to ages of the e-mails.

24. A computer program product as claimed in claim 20, further including:
  computer readable program code means configured for categorizing the received and sent e-mails in categories including: i) initial e-mails received (e-mails R1), ii) e-mail responses sent for e-mails R1 (e-mails S1), iii) e-mails received in reply to e-mails S1 (e-mails R2), iv) e-mail responses sent for e-mails R2 (e-mails S2) and v) e-mails received in reply to e-mails S2 (e-mails R3); and
  computer readable program code means configured for displaying the e-mails to the user in combinations of the categories of the e-mails R1, R2, S1, S2 and S3 requested by the user, wherein the e-mails are displayed so that the categories of the e-mails are distinguishable by distinctive appearances.

25. A computer program product as claimed in claim 20 further including computer readable program code means configured for searching the PED by said ES for co-relations amongst the e-mails received, wherein the co-relations are determined responsive to at least one of the following: senders of the e-mails, subjects of the emails and keywords of the e-mails.

26. A computer program product as claimed in claim 20, wherein the identifying when to prepare reply templates includes, for such a one of the reply templates, selecting among i) preparing the reply template immediately, ii) preparing the reply template at some future time, and iii) not preparing the reply template, the selecting being responsive to whether one of the received e-mails specifies a Cc address.

27. A computer program product as claimed in claim 20, wherein the identifying when to prepare reply templates includes, for such a one of the reply templates, selecting among i) preparing the reply template immediately, ii) preparing the reply template at some fixture time, and ii) not preparing the reply template, the selecting being responsive to a length of one of the received e-mails.

28. A computer program product as claimed in claim 20, wherein the categorizing of the e-mails includes identifying lengths of the e-mails, and the analyzing to extract certain content of the e-mails is responsive to the lengths.

* * * * *